Figure 6:
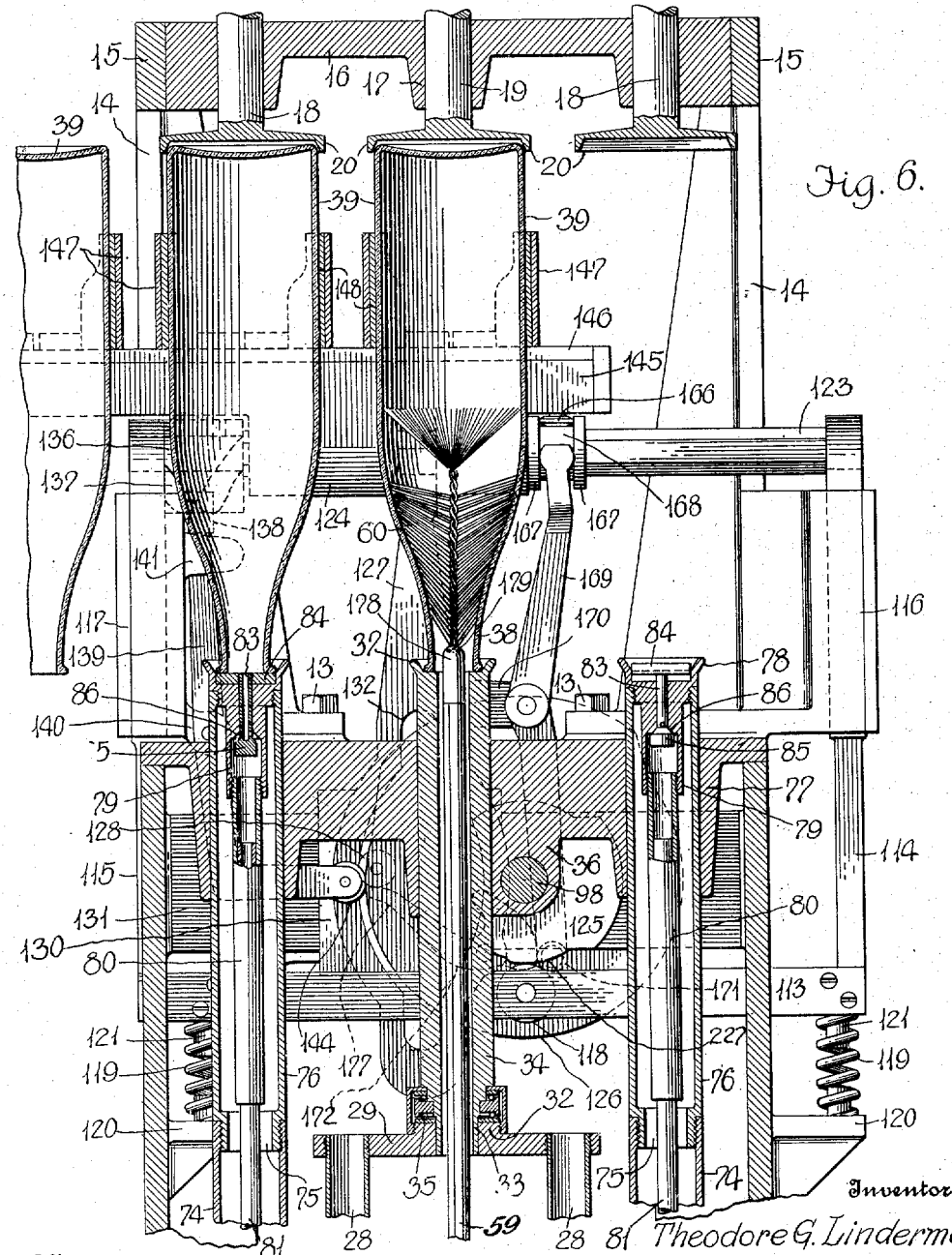

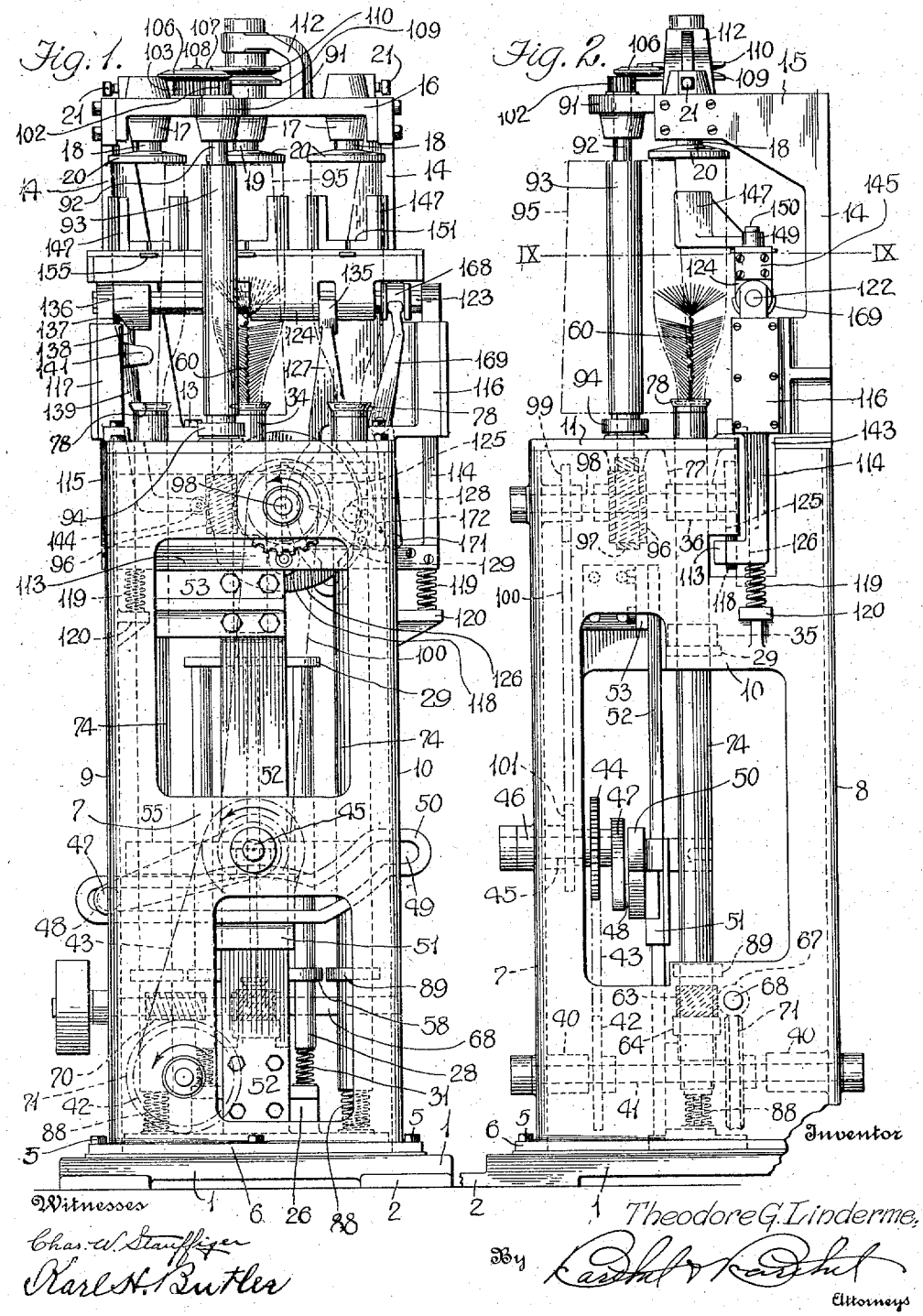

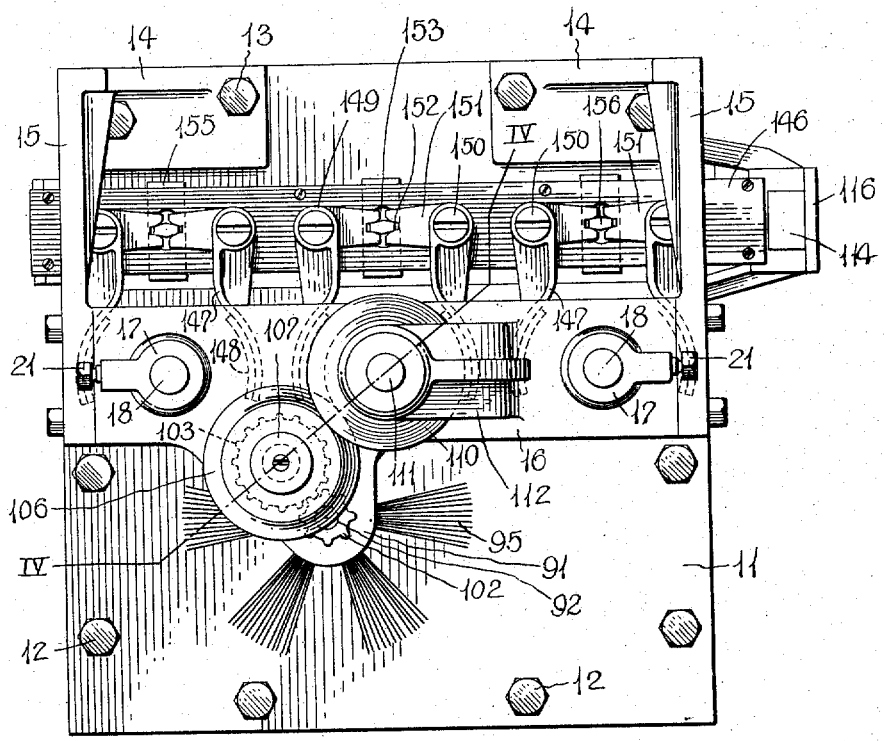

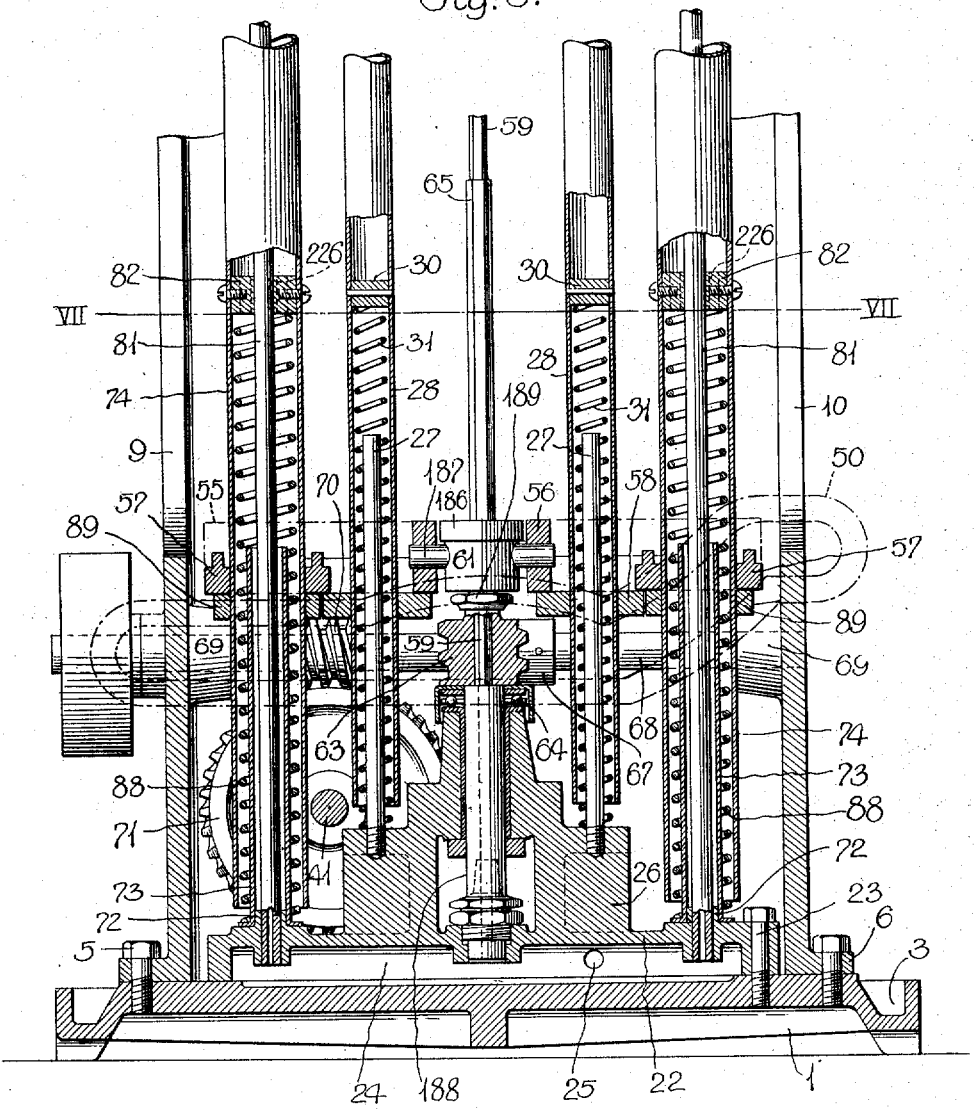

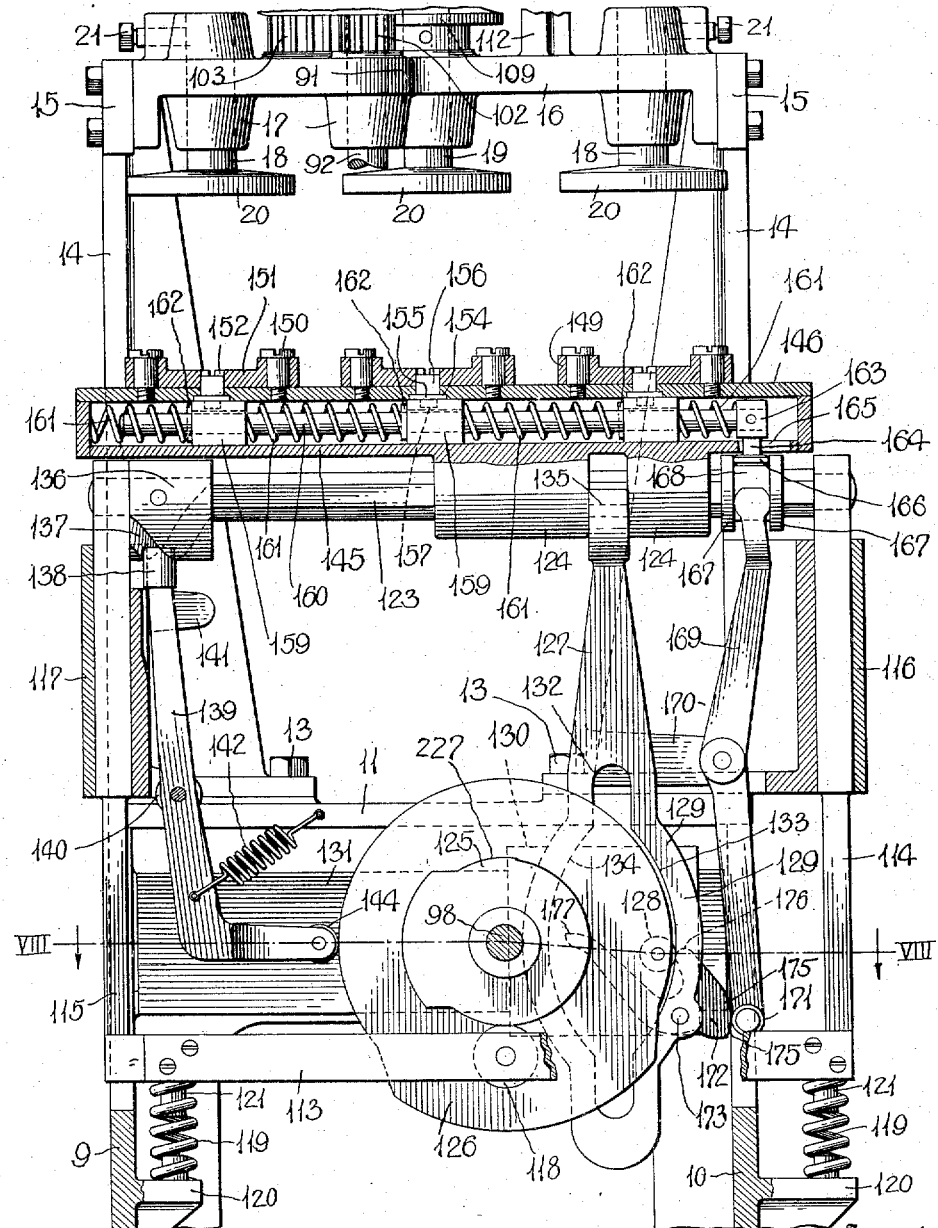

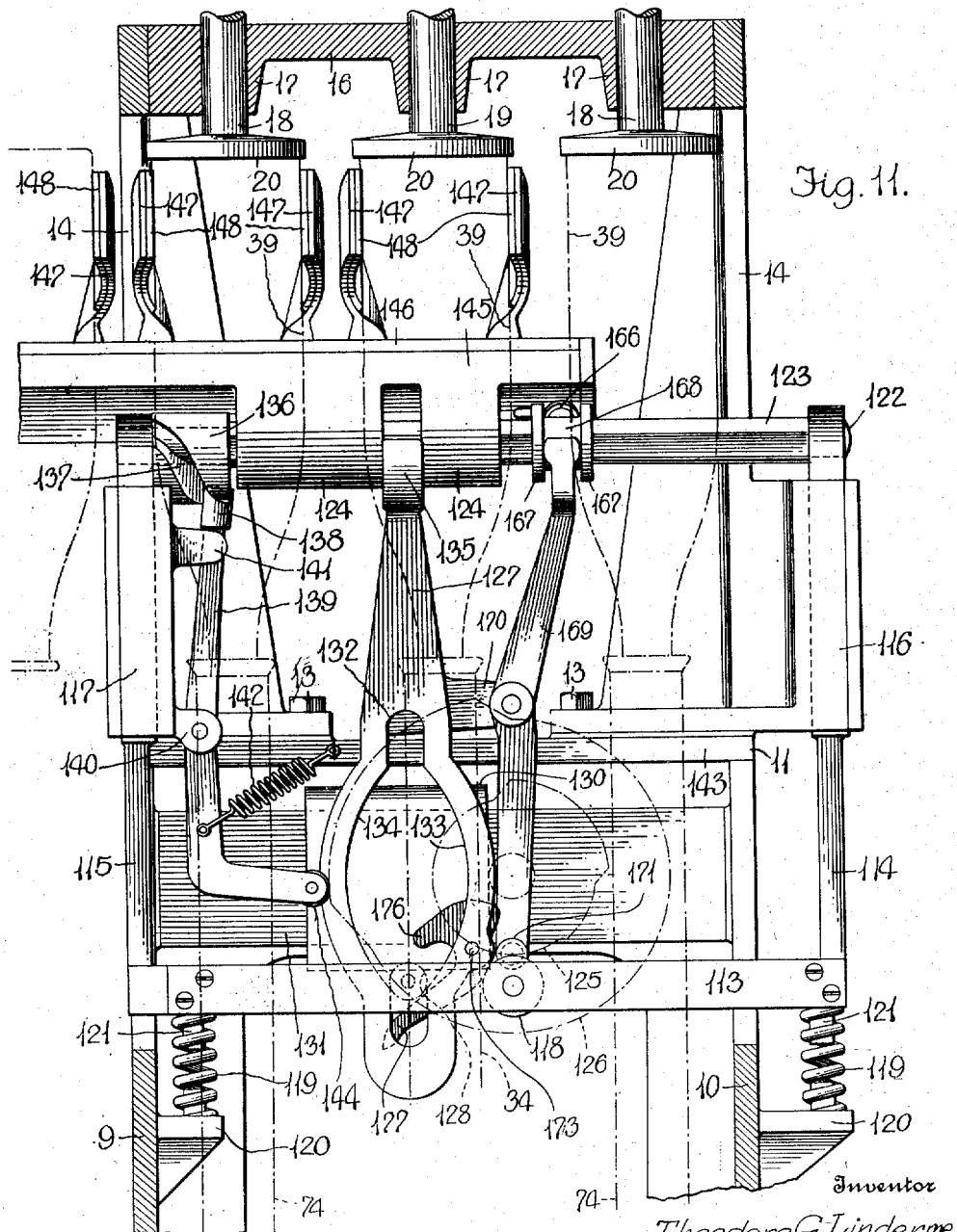

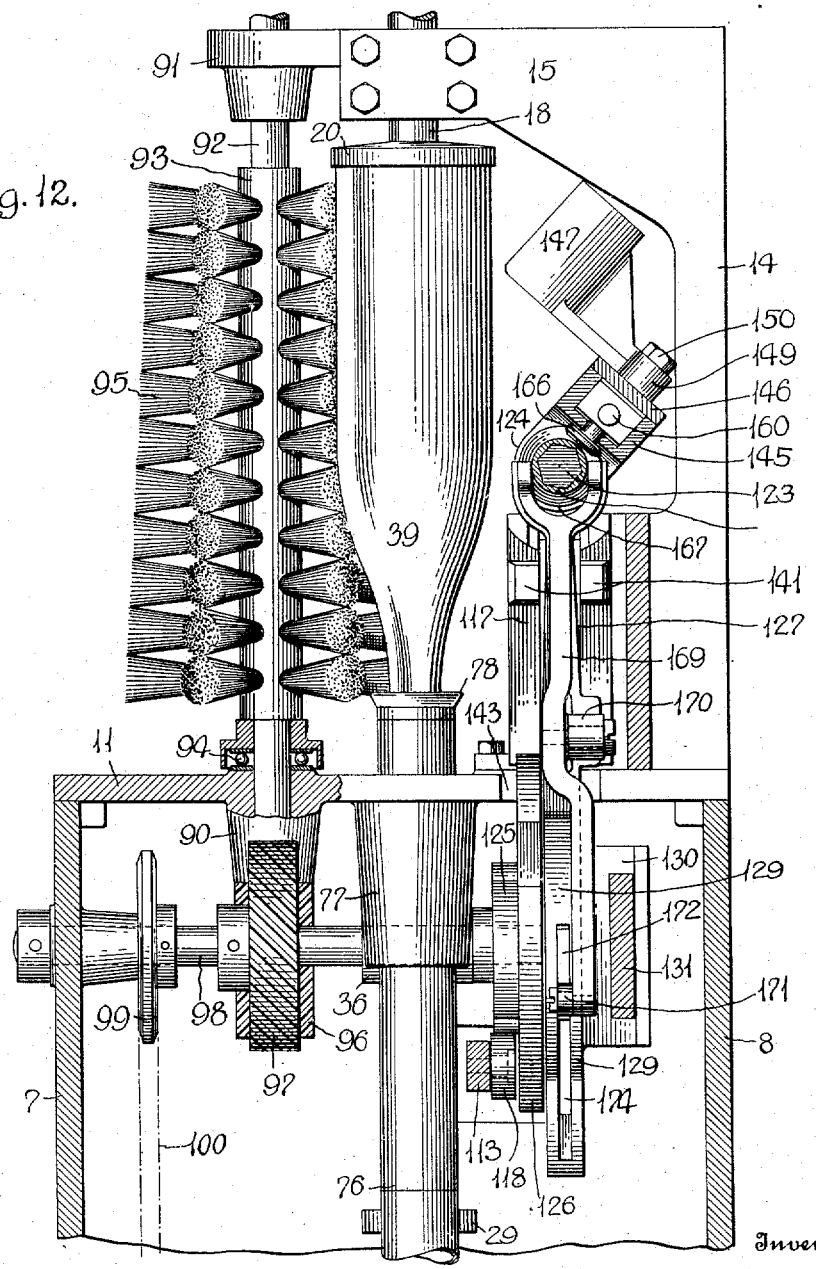

T. G. LINDERME.
BOTTLE WASHING MACHINE.
APPLICATION FILED DEC. 17, 1914.
1,199,998.
Patented Oct. 3, 1916.
15 SHEETS—SHEET 11.
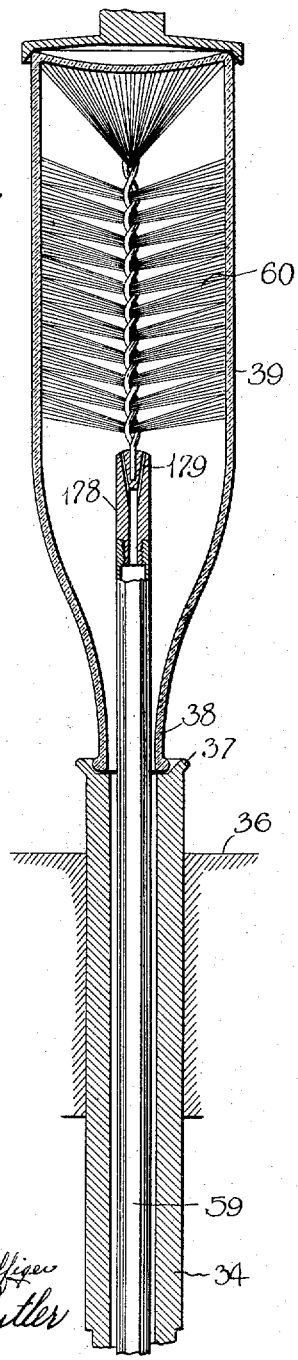
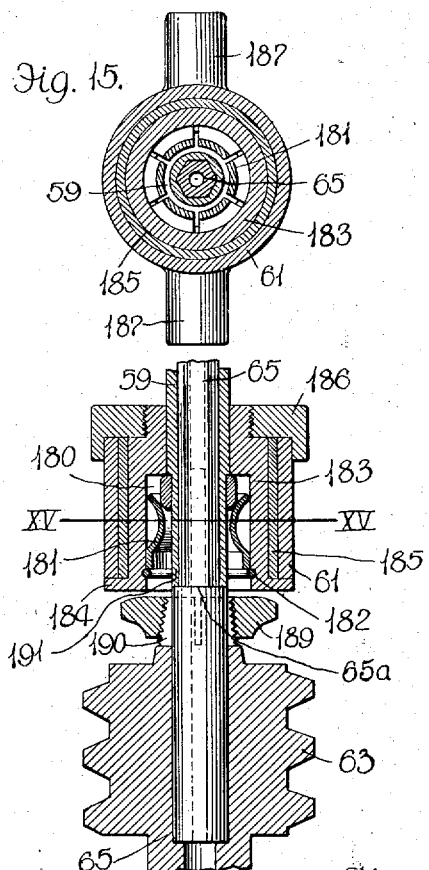
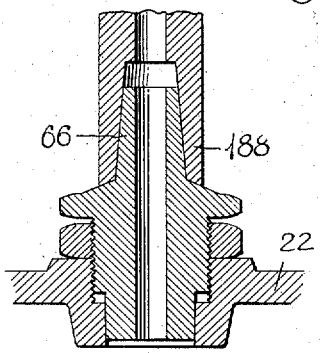
Witnesses
Chas. W. Stauffer
Karl H. Butler
Inventor
Theodore G. Linderme,
By Casdel & Casdel
Attorneys

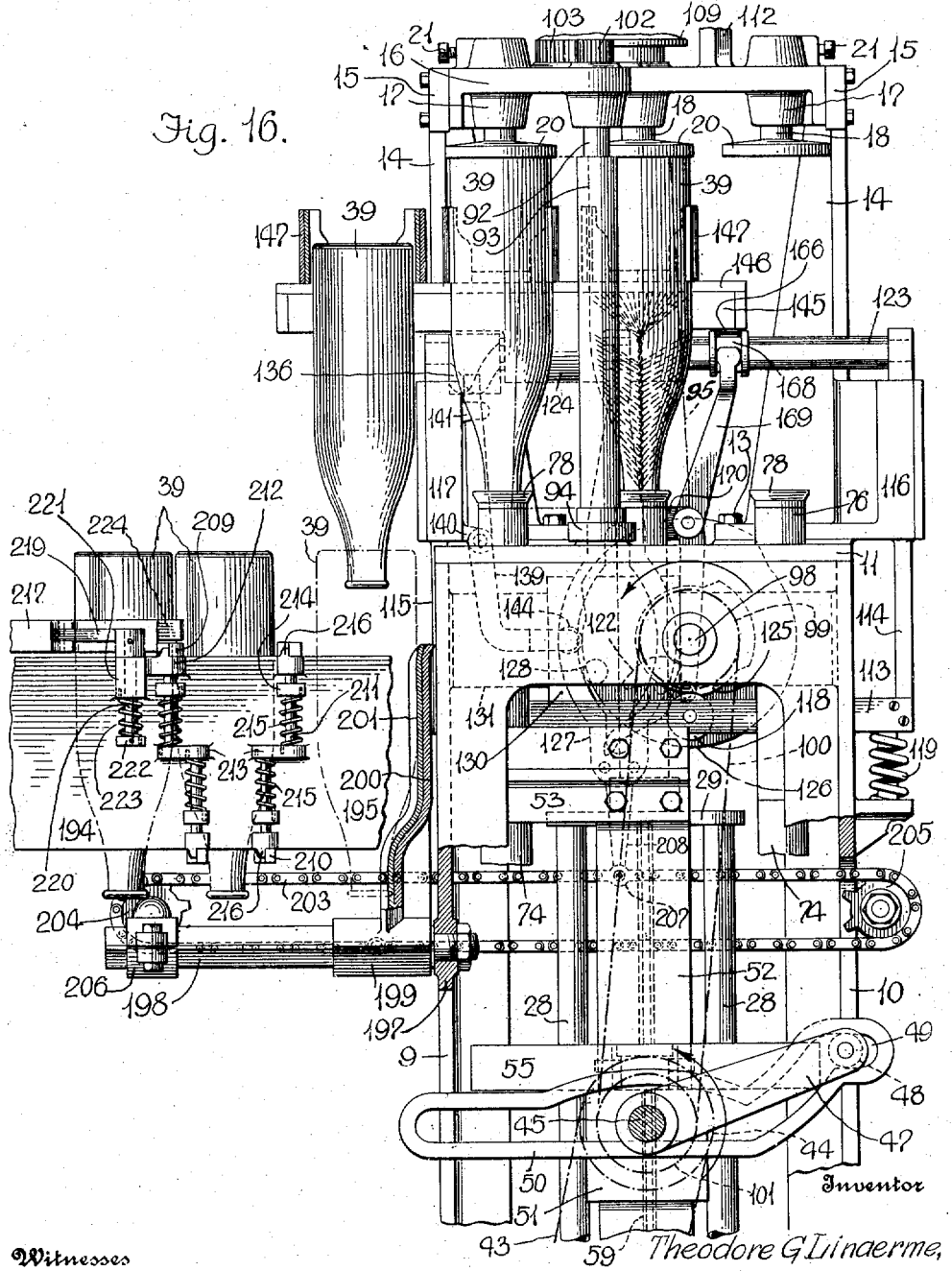

T. G. LINDERME.
BOTTLE WASHING MACHINE.
APPLICATION FILED DEC. 17, 1914.
1,199,998.
Patented Oct. 3, 1916.
15 SHEETS—SHEET 13.
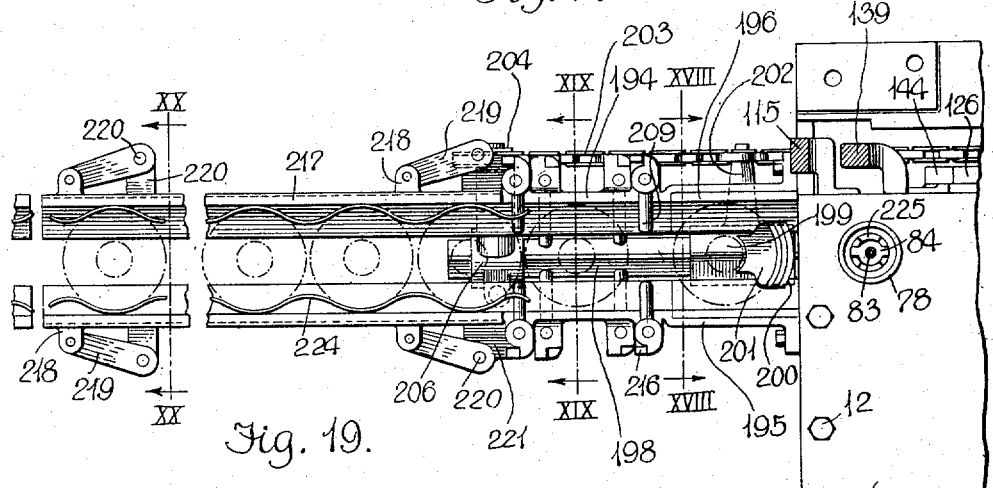
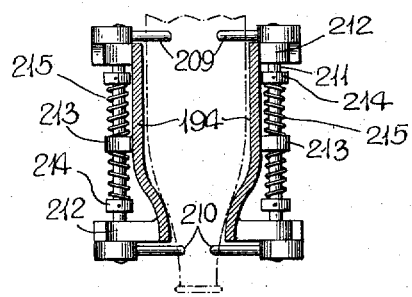
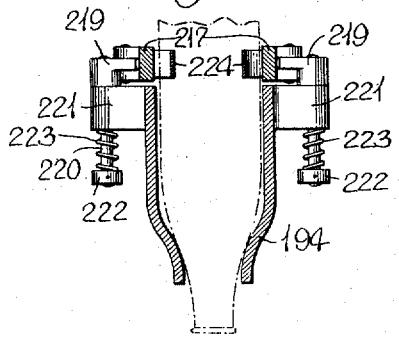
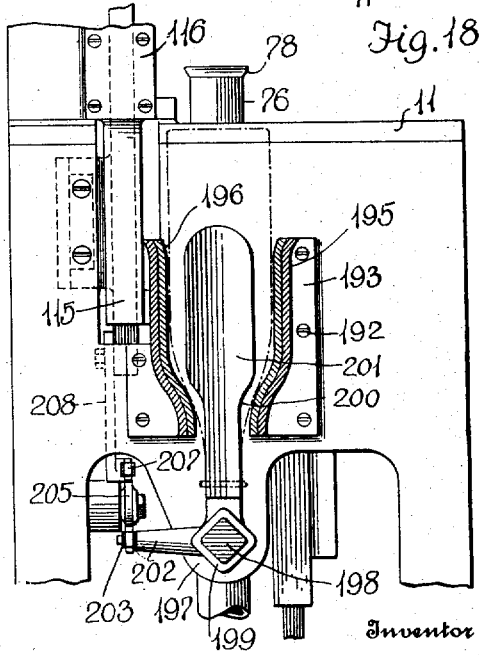
Witnesses
Chas. W. Stauffiger
Karl H. Butler
Inventor
Theodore G. Linderme,
By Karl H. Butler
Attorneys

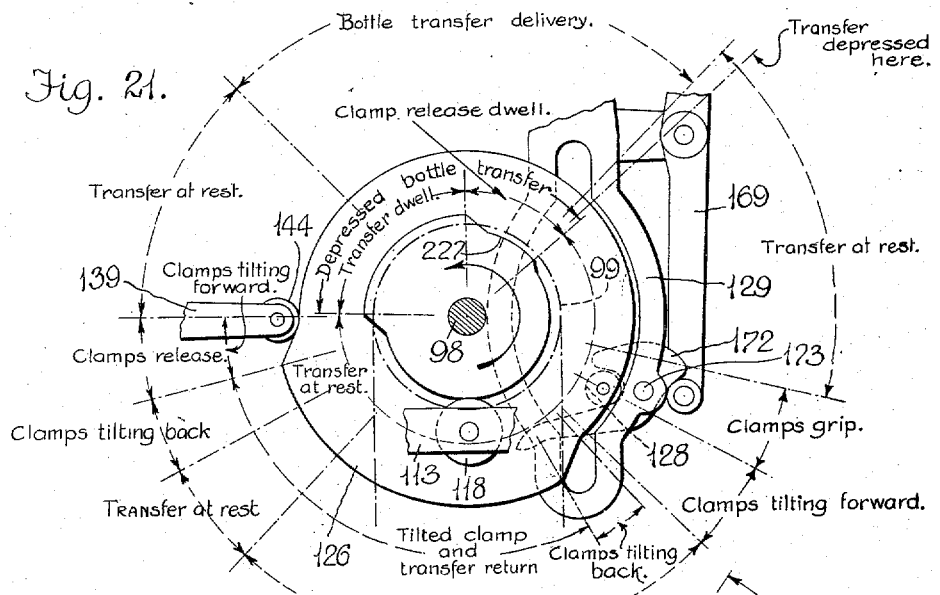
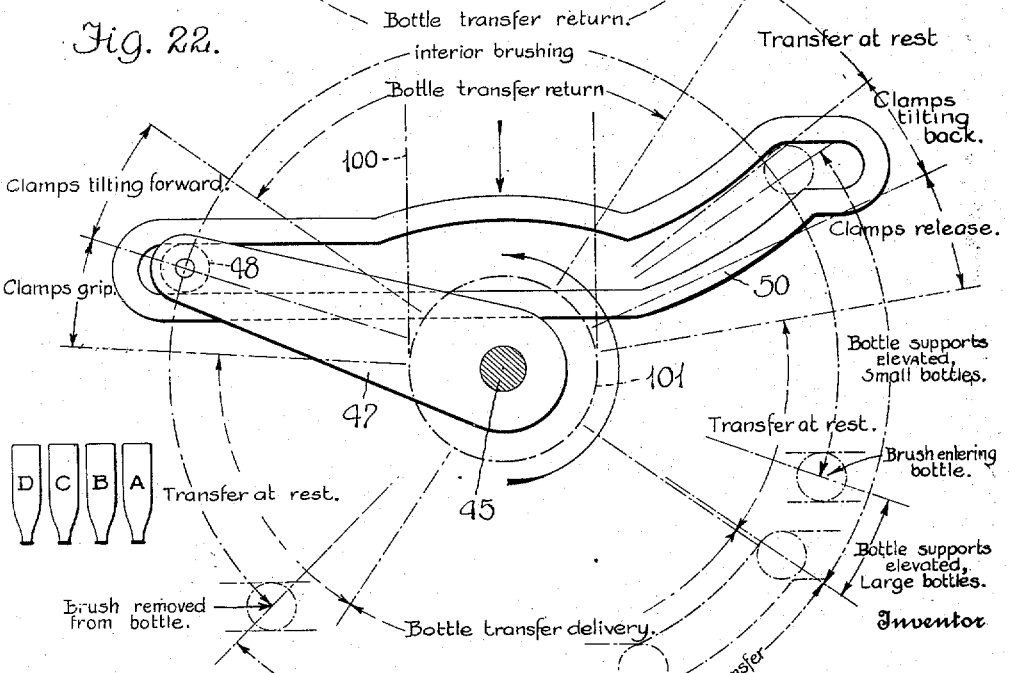

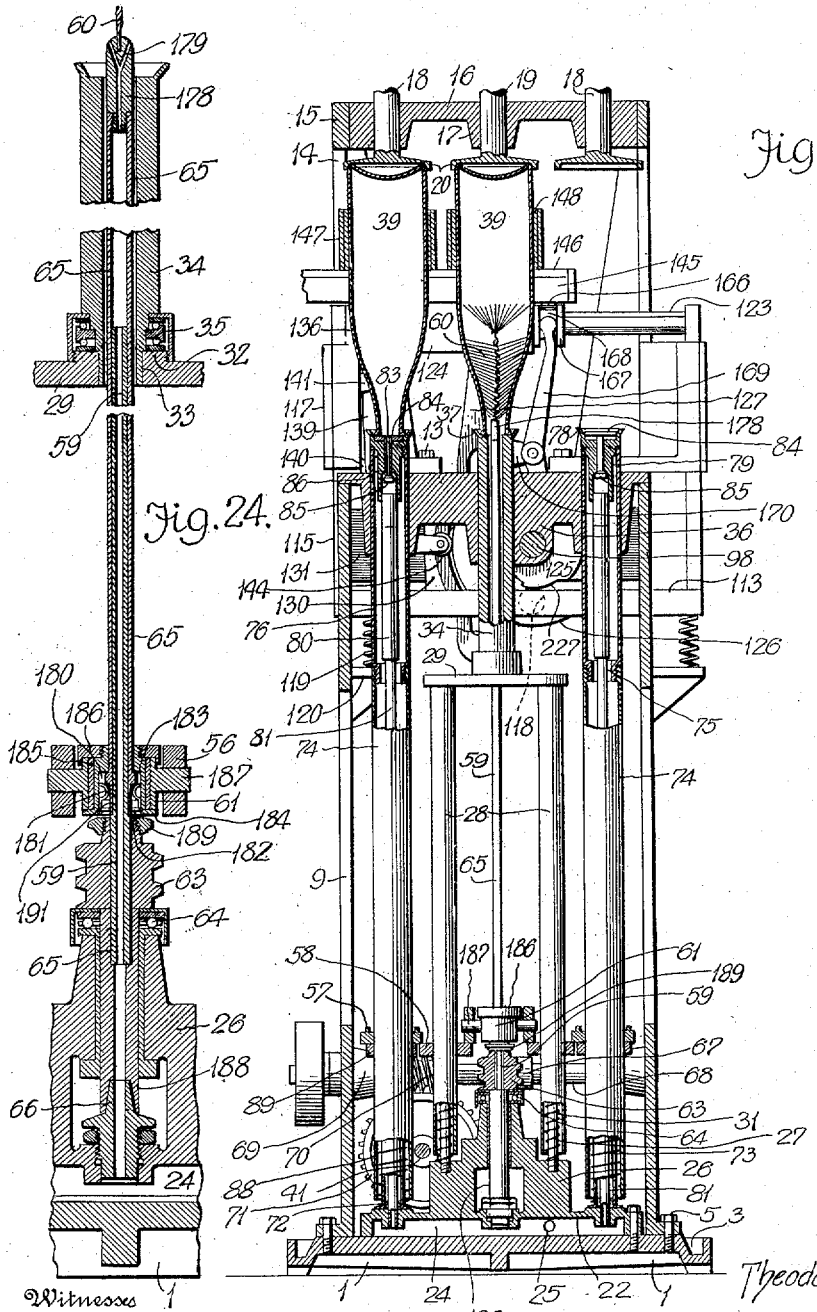

UNITED STATES PATENT OFFICE.

THEODORE G. LINDERME, OF DETROIT, MICHIGAN.

BOTTLE-WASHING MACHINE.

1,999,998.  Specification of Letters Patent.  Patented Oct. 3, 1916.

Application filed December 17, 1914. Serial No. 877,724.

*To all whom it may concern:*

Be it known that I, THEODORE G. LINDERME, a citizen of the United States of America, residing at Detroit, in the county of Wayne and State of Michigan, have invented certain new and useful Improvements in Bottle-Washing Machines, of which the following is a specification, reference being had therein to the accompanying drawings.

The bottle washing machine has been especially designed for thoroughly cleansing that type of bottle used as a container for alcoholic and non-alcoholic beverages, particularly "pop" bottles, but from the following description it will be apparent that by changing the size and shape of certain elements of the machine milk bottles and various kinds of receptacles can be washed by the machine.

The primary object of my invention is to provide a machine of the above type wherein simple and effective means are employed for expeditiously cleaning the interior and exterior of a bottle by repeatedly rinsing and subjecting the walls thereof to the action of a brush or cleansing agent.

Another object of this invention is to provide a bottle washing machine into which bottles can be safely fed and intermittently moved therein to be successively subjected to cleansing operations which are of a nature to insure speedy removal of most indurate foreign matter that adheres to a bottle. It is in this connection, that special provision has been made to guard against breakage, both the bottles and the machine, the former when being transferred and subjected to washing operations and the latter when stoppers, corks or other devices are encountered.

With the above and such other objects in view as may hereinafter appear, the invention in its broadest aspect involves a machine embodying many novel features and instrumentalities by which bottles can be economically and thoroughly cleansed.

The operation of the machine is characterized by first holding a bottle in such manner that the interior thereof can be subjected to a rinsing operation. Second, shifting the bottle to a position in the machine where the interior thereof can be subjected to the action of water and a brush; third, shifting the bottle to another position in the machine to receive a final internal rinsing, and fourth, again shifting the bottle to a position where it can be released to enter a conveyer that automatically removes the bottle to a desired station. All these operations are intermittently and successively carried out by groups of coöperative devices, some of which individually possess characteristic novelty in a bottle washing machine.

The principal elements and associated devices of the machine may be noted under the following captions: Machine base, housing and top bracket. Center telescopic yieldable bottle support. Reciprocable operating mechanism for the center bottle support. Interior cleaning brush and its operating mechanism. End telescopic yieldable bottle supports. Exterior cleaning brush and its operating mechanism. Friction drive for center bottle support. Reciprocable and tiltable transferring devices. Reciprocable mechanism for the transferring device. Tilting mechanism for the transferring device. Bottle gripping arms and actuating mechanism. Bottle conveyer. These elements and devices will be hereinafter separately and specifically described in detail, together with the novel arrangement and objects accomplished from such a combination of elements, and reference will now be had to the drawings, wherein—

Figure 7:
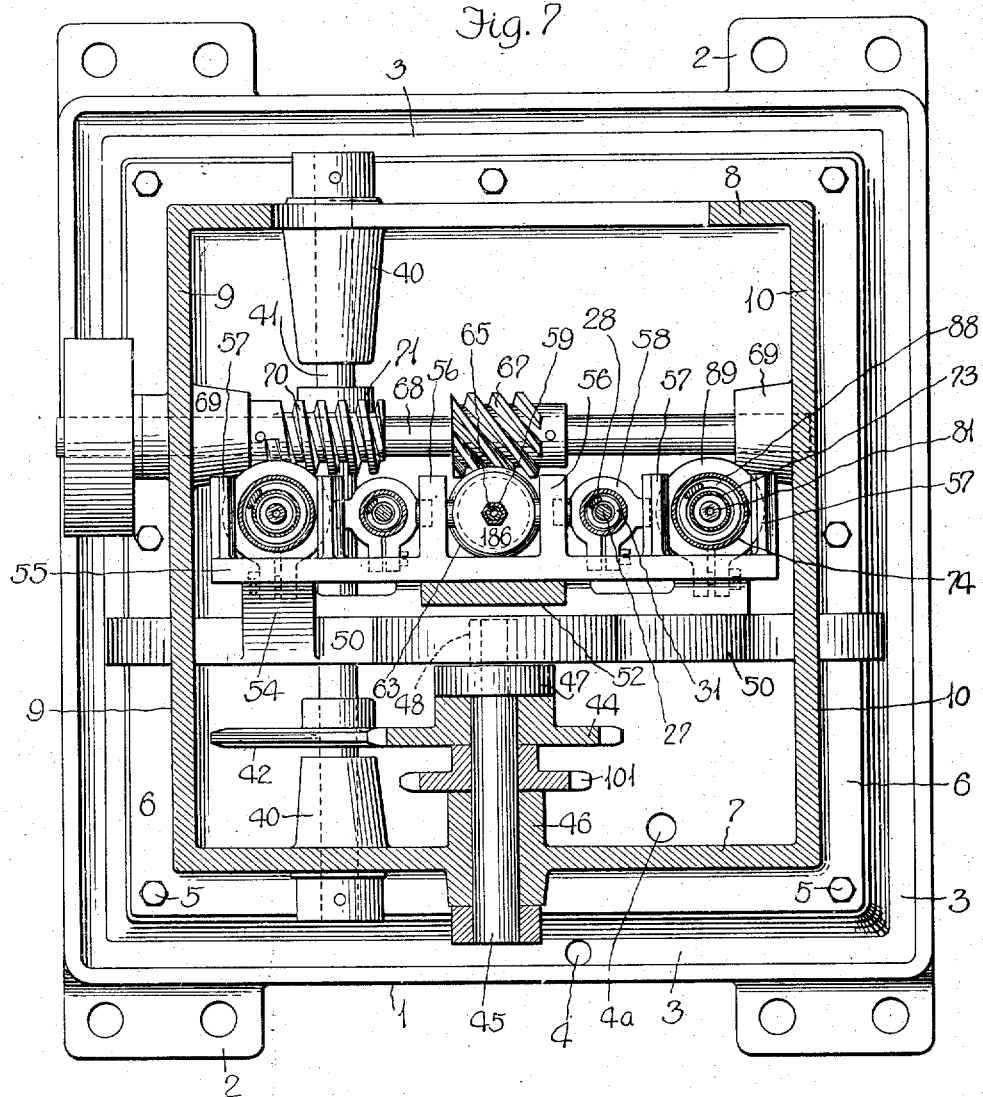
Figure 8:
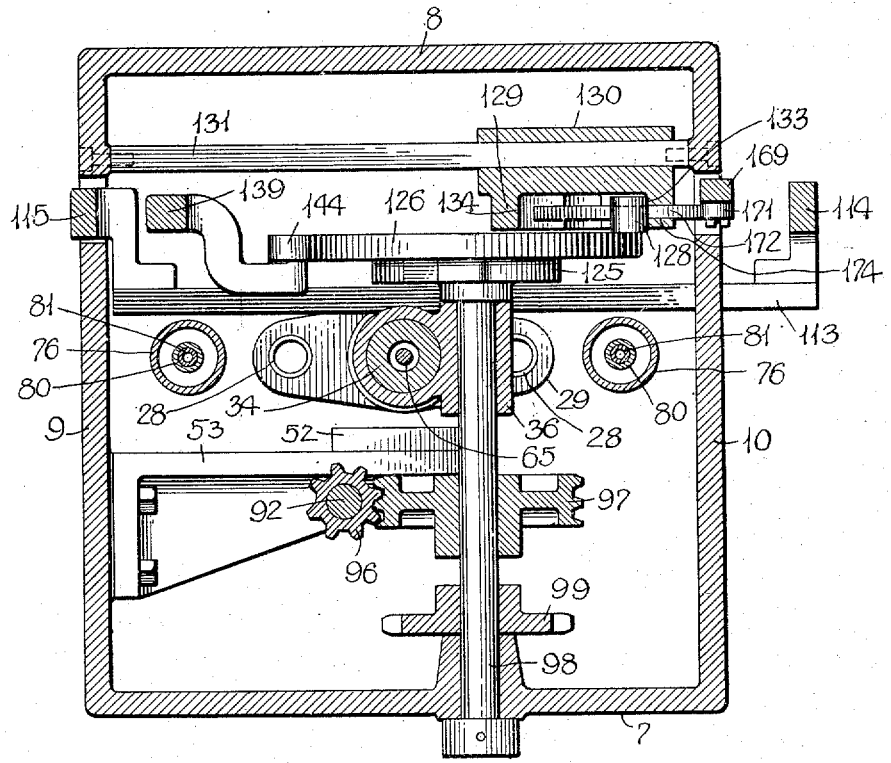
Figure 9:
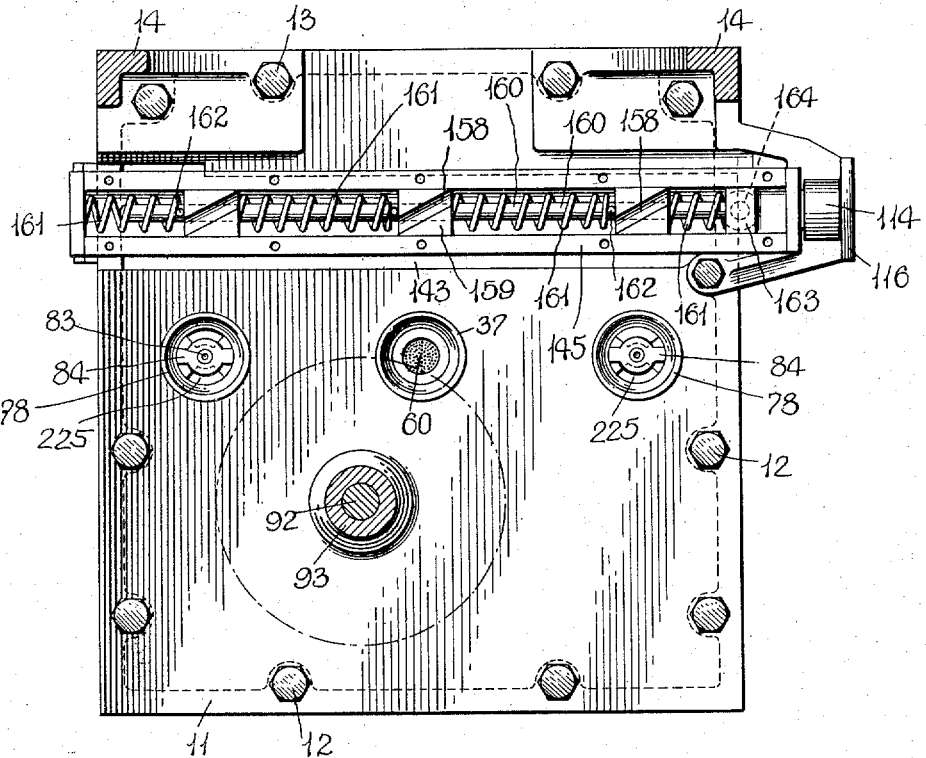

Figure 1 is a front elevation of the machine; Fig. 2 is a side elevation of the same; Fig. 3 is an enlarged plan of the machine; Fig. 4 is a vertical sectional view of a friction drive for the center bottle support, taken on or about the line IV—IV Fig. 3; Fig. 5 is an enlarged vertical sectional view of the lower portion of the machine; Fig. 6 is a similar view of the upper portion of the machine, and representing a continuation of Fig. 5; Fig. 7 is a horizontal sectional view of the machine taken on the line VII—VII of Fig. 5; Fig. 8 is a similar view taken on the line VIII—VIII of Fig. 10; Fig. 9 is a similar view taken on the line IX—IX of Fig. 2; Fig. 10 is an enlarged transverse sectional view of the upper portion of the machine illustrating in detail the reciprocable and tiltable bottle transferring device, showing the same in normal position; Fig. 11 is a similar view of the machine showing the bottle transferring device in front elevation and in position for discharging the bottle; Fig. 12 is a vertical sectional view of the upper portion of the machine illustrating the exterior cleaning brush and its operating mechanism; Fig. 13 is an enlarged vertical sectional view of an inverted bottle showing the interior brush therein; Fig. 14 is a similar view of a slip joint for the interior brush; Fig. 15 is a horizontal sectional view of the slip joint taken on the line XIV—XIV of Fig. 14; Fig. 16 is a front elevation of the upper portion of the machine, illustrating a portion of a conveyer and showing the operating mechanism of the machine in position to deposit a bottle in the conveyer; Fig. 17 is a plan of a portion of the conveyer; Fig. 18 is a cross sectional view taken on the line XVIII—XVIII of Fig. 17; Fig. 19 is a cross sectional view of the conveyer taken on the line XIX—XIX of Fig. 17; Fig. 20 is a similar view taken on the line XX—XX of Fig. 17; Figs. 21 and 22 are diagrammatic views illustrating various steps, successive operations and functions of cams, levers, etc., of the machine; Fig. 23 is a vertical sectional view of the machine partly in elevation, and Fig. 24 is a detail sectional view of the brush carrying rod, showing the conduits thereof.

*Machine base, housing and top bracket.—* The machine base, best shown in Figs. 1, 2, 5 and 7 is designated 1 and is rectangular in plan. The front and rear edges of the base have apertured feet or lugs 2 by which the base can be secured to a floor or suitable support. Contiguous to the side edges of the base is a gutter or trough 3 provided with a drain opening 4 and this gutter or trough is adapted to collect water or cleansing fluid that may be splashed upon or accumulate on the base of the machine. The base also has a drain opening 4ª. Secured to the base 1 by screw bolts 5 or other fastening means is the lower flanged end 6 of an upright housing, comprising a front wall 7, a rear wall 8, and side walls 9 and 10. These walls are cut away or provided with openings to save material, reduce the weight of the same and provide clearance for certain operating mechanisms. Mounted upon the upper edges of these walls is a top plate 11 which is held in place by a screw bolt 12 or other fastening means. Secured to the top plate 11, at the rear edge thereof by a screw bolt 13 or other fastening means is a top bracket 14 having side arms 15 connected by a transverse support 16. The support 16 has apertured bosses 17 for the spindles 18 and 19 of retaining members 20. These retaining members conform in shape to inverted saucers and are adapted to receive the closed ends or bottoms of inverted bottles placed in the machine. The spindle 19 is located intermediate the spindles 18 and the spindles 18 are retained in the bosses 17 by set screws 21. Reference will again be had to the central spindle 19 in connection with the friction drive for the center bottle support. The machine base, housing and top bracket are made of light and durable structural metal having such dimensions as to occupy a comparatively small space and yet provide a rigid and durable structure.

*Center telescopic yieldable bottle supports.—* Considering the above matter reference will be had to Figs. 1, 2, 5 and 6, particularly Fig. 5, showing the base 1 provided with a transverse inverted casing 22 that is secured to the base 1 by screw bolts 23 or other fastening means. The casing 22 coöperates with the base plate 1 in forming a reservoir 24 for water or a suitable detergent fluid, which is admitted, under pressure, to the reservoir 24 through a port 25. The top of the casing 22 is provided with a central pedestal 26 and suitably connected to said pedestal is a set of guide posts 27. Telescoping the posts 27 are tubular uprights 28, with the upper ends thereof connected by a cross head 29. Intermediate the ends of the uprights 28 are fixed heads 30 and engaging said heads are coiled compression springs 31 which encircle the posts 27 and rest upon the pedestal 26. The coiled compression springs 21 are housed by the lower ends of the tubular uprights 28 and said springs cushion and yieldably support the cross head 29. The cross head 29 has an apertured boss 32 and extending into said boss is a lower stepped end 33 of a tubular bottle support 34 rotatably supported at the boss 32 by a conventional form of anti-frictional bearing 35. The upper end of the tubular bottle support 34 extends through a bearing or enlargement 36 of the top plate 11 and has the end thereof flared or funnel shaped, as at 37 to receive the mouth or neck 38 of an inverted bottle 39. The closed end of the bottle 39 is adapted to be held by the retaining member 20 of the central spindle 19, such construction being best shown in Fig. 6. The central bottle support 34 alines with the central spindle 19 of the top bracket and is adapted to vertically reciprocate relative to the retaining member 20, whereby a bottle can be transferred to and from said support.

*Reciprocable operating mechanism for center bottle supports.—* As shown in Figs. 1, 2, 7 and 16 the front and rear walls 7 and 8 of the housing have alining bearings 40 for a drive shaft 41. The shaft 41 adjacent the front wall 7, has a sprocket wheel 42 and engaging said sprocket wheel is a sprocket chain 43 which is trained over a sprocket wheel 44 mounted upon a stub shaft 45 journaled in a bearing 46 of the housing wall 7. The inner end of the stub shaft 45 has a crank 47 provided with an anti-frictional roller 48, said roller extending into the cam slot 49 of a cam 50. The cam 50 extends transversely of the machine and is carried by a cross head 51 slidable upon a vertical guide 52, carried by the top of the casing 22 and a bracket 53 that extends inwardly from the side wall of the housing. One end of the cam 50 has a bracket 54 supporting a presser head 55 at the rear side of the guide 52 and said presser head has a set of trunnion arms 56 and sets of contact arms 57. The arms 56 and 57 coöperate in impinging upon collars 58 clamped upon the tubular uprights 28, whereby when the presser head 55 is lowered through the medium of the cam 50 the tubular uprights 28 will be lowered and consequently the center bottle support 34.

*Interior cleaning brush and its operating mechanism*, (Figs. 6, 13, 14 and 15.)—Extending through stepped end 33 of the center bottle support 34 is a hexagonal hollow brush rod 59 adapted to reciprocate therein and attached to the inner end of said rod is a nozzle 178 provided with diverging openings 179 adapted to discharge water or other fluid into a bottle upon the support 34. Attached to the nozzle 178 and longitudinally alining with the rod 59 is a brush 60 and the bristles of said brush are arranged to contact with the inner walls and bottom of the bottle. The bristles of the brush are held in a retracted position when housed by the walls of the bottle supports 34, but when the brush is elevated to enter the bottle and revolved in an opposite direction to that of the bottle, the walls of the bottle are cleaned and there is sufficient space between the rod 59 and the walls of the support 34 for water and foreign matter to drain from the bottle. The lower end of the brush rod 59 is cylindrical, as at 191, and has a collar 180 with the upper edge thereof beveled and said collar normally engages a slitted slip member 181 mounted by a ring 182 or other fastening means in a housing 183. The lower end of the housing 183 has an annular flange 184 supporting a bushing 185 and a collar 61 said bushing and said collar being retained upon the housing by a cap 186 screwed upon the upper reduced end of the housing. The collar 61 has trunnions 187 extending into the arms 56, and it is through the medium of this connection with the presser head 55 that the brush rod 59 is raised in the center bottle support 34 when the presser head is elevated by the cam 50. Should, however, a cork, closure or other obstacle be encountered at the neck of the bottle, the member 181 yields or slips and allows the housing 183 to be raised independently of the brush rod 59. When the housing 183 is lowered or restored to normal position, the member 181 rides over the upper beveled edge of the collar 180 and assumes its normal position below said collar. The slip joint is essential in connection with the machine and also serves as a bearing, insomuch as the housing 183 is revolved in the collar 61, as will hereinafter appear. Extending through the brush rod 59, in proximity to the nozzle 178, is a hexagonal tube 65 and the lower end of said tube is cylindrical to provide an annular shoulder 65$^a$ and is secured in a horizontally disposed gear or worm 63 having a hollow hub 188 mounted over a nipple 66 in communication with the reservoir 24. The hollow hub 188 is journaled in the pedestal 26 and at the upper end of said pedestal is an anti-frictional end thrust bearing 64 upon which bears the gear wheel 63. To further insure rotative continuity of the tube 65 and the gear wheel 63, the gear wheel is clamped upon the tube by a nut 189 screwed upon a split cone 190 of the gear wheel, and resting upon the annular shoulder 65$^a$ is the lower cylindrical end 191 of the rod 59, said shoulder coöperating with the member 181 in supporting the collar 180 of the rod 59. Meshing with the gear 63 is a worm 67 mounted upon a transverse shaft 68, journaled in bearings 69, carried by the side walls 9 and 10 of the machine housing. The transverse shaft 68 is provided with another worm 70 and meshing with said worm is a gear 71 mounted upon the shaft 41. It is therefore evident that the brush rod 59 can be revolved in the center bottle support 34, also reciprocated upon the tube 65 through the medium of which said brush rod is revolved. The shaft 68 is used as a power shaft and can be driven by a motor or from a suitable source of energy.

*End telescopic yieldable bottle supports.*—Again referring to Figs. 5 and 6, it will be observed that the ends of the casing 22 are provided with apertured nipples or bosses 72 and mounted over the upper ends of said nipples or bosses are tubular posts 73. Telescoping said tubular posts are tubular uprights 74 that extend in proximity to the top plate 11 and have the upper ends thereof interiorly screwthreaded to receive the reduced ends 75 of extensions 76. The extensions 76 are slidably mounted in depending bearings 77 carried by the top plate 11 and the upper ends of said extensions are interiorly screw threaded to receive flared or funnel shaped mouth pieces 78 adapted to receive the necks or mouths of bottles placed in the retaining members 20 of the spindles 18. The mouth pieces 78 have depending valve bodies 79 to the lower ends of which are connected guides 80. The guides 80 telescope tubes 81 that extend through the reduced ends 75 of the extensions 76, heads 82 mounted in the tubular uprights 74, and downwardly through the tubular post 73 into the nipples or bosses 72 of the casing 22. The tubes 81 are adapted to convey water from the reservoir 24 to the valve bodies 79 and each valve body has a tubular valve stem 83 provided at its upper end with a cross head 84 and at its lower end with a valve 85. The tubular valve stem 83, adjacent the valve 85 is apertured to communicate with the interior of the valve body and said body has a seat 86 for the valve 85 whereby such communication can be shut off. The valve 85 is normally seated by pressure of water within the valve body and when seated the head 84 is raised in the mouth piece 78, thereby preventing the escape or ejection of water from the reservoir 24, until a bottle is placed in position upon the head 84 to depress the same and open the valve 85. Encircling the tubular post 73, between the heads 82 of the tubular uprights 74 and the top of the casing 22, are coiled compression springs 88 that cushion the tubular uprights 74 and their appurtenant parts when bottles are placed in engagement with the mouth pieces 78. The tubular uprights 74 are provided with collars 89, which are clamped thereon and adapted to be engaged by the sets of contact arms 57 of the presser head 55, whereby the end bottle supports can be retracted to permit of the removal of bottles. In order that water or the detergent fluid employed for cleansing the interior of a bottle can drain from the same when on one of the end supports, the valve bodies 79 are provided with ports 225 in communication with the extensions 76, and the heads 82 of the uprights 74 are provided with ports 226. It is therefore possible for the fluid to pass out of the lower ends of the uprights 74. Since the yieldable supports are telescopic, it is apparent that bottles of various length can be held thereby.

*Exterior cleaning brush and its operating mechanism.*—The top plate 11 and the top bracket 15 are provided with vertically alining bearings 90 and 91 for the spindle 92 of a brush body 93. This is best shown in Fig. 12, where it will be observed that the brush body rests upon an end thrust bearing 94 and is provided with bristles 95 forming a frusto conical shaped brush approximately central of the machine. The bristles 95 are adapted to contact with the exterior of a bottle in the center support and a bottle in an end support at the delivery side of the machine. The lower end of the spindle 92 is provided with a worm 96 and meshing with this worm is a gear 97 mounted upon a shaft 98, journaled in the front wall 7 of the machine housing and the bearing 36, as best shown in Fig. 8. The shaft 98 has a sprocket wheel 99 and trained over said wheel is a sprocket chain 100 that extends under a sprocket wheel 101 mounted upon the stub shaft 45.

*Friction drive for center bottle support.*— The upper end of the spindle 92 of the brush is provided with a small gear wheel 102, located above the support 16 and meshing with a large horizontally disposed gear wheel 103. This gear wheel is loosely mounted upon a stud 104 mounted in the support 16 and is connected by pins 105 to a beveled friction disk 106 retained upon the stud 104 by a washer 107 and a screw 108. The periphery of the beveled friction disk 106 extends between friction disks 109 and 110, the former being mounted upon the upper end of the spindle 19 associated with the center bottle support. The friction disk 110 is mounted upon a short shaft 111 journaled in a bearing 112 forming part of the support 16, as best shown in Fig. 3. With a bottle engaging the retaining member 20 of the spindle 19, the spindle is slightly elevated and retains the friction disk 109 in engagement with the disk 106, which is driven by the disk 110; consequently the disks 109 and 110 are driven from the brush spindle 92 and the bottle in the central support of the machine is revolved in a reverse direction from that of the exterior cleaning brush.

*Reciprocable and tiltable bottle transferring device.*—Referring particularly to Figs. 10 and 11, it will be noted that the side walls 9 and 10 of the machine housing are cut away to provide clearance for the ends of a transverse frame 113 having vertical side arms 114 and 115 slidable in guides 116 and 117 respectively forming part of the top bracket of the machine. The frame 113, intermediate the ends thereof, has a side roller 118 through the medium of which the frame is reciprocated, and coöperating with said roller in this purpose are coiled compression springs 119 interposed between the ends of the frame 113 and brackets 120 carried by the side walls 9 and 10 of the housing. The springs 119 are retained in position to hold the frame 113 normally elevated by studs 121 on the ends of said frame and on said brackets. Journaled in the upper ends of the arms 114 and 115 of the reciprocable frame 113 are the spindles 122 of a rock shaft 123, which is hexagonal in cross section, as best shown in Fig. 12. Slidable longitudinally of the rock shaft 23 and adapted to rock therewith are depending lugs 124 of the bottle transferring device proper, which is adapted to grip bottles and shift them from one position to another through the machine. In order that this can be accomplished at predetermined times, provision is made for tilting the transferring device whereby it can assume a position to grip bottles, for horizontally reciprocating the transferring device to place bottles in proper position to be operated upon, for vertically reciprocating the transferring device whereby bottles can be released from the retaining members 20, and for actuating the gripping mechanism of the transferring device, all of which will now be considered in its order.

*Reciprocable mechanism for the transferring device.*—As just mentioned under the preceding caption, the transferring device must be reciprocated in vertical and horizontal planes and the vertical reciprocation of the transferring device is accomplished by providing the shaft 98 with a small cam 125 adapted to engage the roller 118 of the frame 113 and lower said frame, such movement removing the closed ends of the bottles 39 from the retaining members 20. The small cam 125 has an auxiliary cam surface 227, the object of which will appear in the general operation of the machine. The roller 118 is held normally in engagement with the cam 125 by the coiled compression springs 119 and it is during one revolution of the shaft 98 that the frame 113 and the transferring device carried thereby are lowered.

Horizontal reciprocation of the transferring device is accomplished by a large cam 126 and an arm 127, best shown in Figs. 8, 10 and 11. The large cam 126 is mounted upon the shaft 98 in parallelism with the small cam 125 and by reference to Fig. 8 it will be observed that these cams are at the end of the shaft 98 and permit of a revoluble roller 128 being carried by the large cam 126, contiguous to the periphery thereof. The revoluble roller 128 extends into the enlarged slotted lower end 129 of the arm 127 and this enlarged end of said arm is carried by a block 130 slidably mounted upon a transverse bar 131 connecting the side walls 9 and 10 of the machine housing. The slot in the arm 127 is designated 132 and is disposed longitudinally of said arm. The longitudinal walls of the slot 132 are concave, as at 133 and 134 and conform in curvature to the periphery of the large cam 126, whereby the arm 127 will remain stationary except when the revoluble roller 128 enters the upper and lower ends of the slot 132. It is then that the arm 127 and the block 130 thereof are shifted longitudinally of the bar 131, from one side of the machine to the other, such reciprocation being necessary in order that the bottle transferring device may advance a bottle from one position to another, through the machine, and eventually discharge the bottle at the delivery side of the machine. The upper end of the arm 127 is forked or bifurcated, as at 135 to extend between the lugs 124 of the transferring device and shift said lugs longitudinally of the hexagonal rock shaft 123.

*Tilting mechanism for the bottle transferring device.*—Fixed upon the hexagonal rock shaft 123, adjacent to the arm 115 and the frame 113, is a sleeve 136 having the periphery thereof provided with a spiral groove 137. Extending into the groove 137 is a revoluble anti-frictional roller 138, carried by the upper end of a bell crank 139 pivotally mounted between apertured lugs 140 forming part of the guide 117. The roller 138 and the groove 137 are of sufficient depth to permit of vertical reciprocation of the frame 113 without the roller 138 being displaced relative to the sleeve 136, and this is also true in connection with the bifurcated or forked end of the arm 127 extending between the lugs 124 on the rock shaft. The upper end of the bell crank 139 is movable between lugs 141 carried by the guide 117 and the lower end of said bell crank is connected by a coiled retractile spring 142 to a wall of an opening 143 in the top plate 11 and through which the arm 127 extends. The lower end of the bell crank 139 is offset and provided with a roller 144 normally engaging the large cam 126 of the shaft 98. The cam 126 actuates the bell crank 139 and rocks the shaft 123, said shaft being held in a locked position during approximately one-third a revolution of the cam 126, this period of dwell being during a horizontal reciprocation of the transferring device.

*Bottle gripping arms and actuating mechanism.*—As illustrated in Figs. 3, 9, 10 and 12 the bottle transferring device is in the form of an oblong housing 145 having a detachable cover plate 146, and it is upon this plate that sets of bottle gripping arms 147 are arranged for simultaneously gripping the bodies of bottles. The arms 147 are curved and arranged in sets for engaging diametrically opposed sides of a bottle and the inner sides of said arms are lined with leather 148 or other yieldable material to avoid cracking or breaking a bottle. The arms 147 have bearings 149 pivotally held upon the cover plate 146 by screw bolts 150 and said bearings are provided with cranks 151 having the confronting ends thereof notched as at 152. The cover plate 146 of the housing 145 has slots 153 and transverse grooves 154 in communication with said slots. Slidable in the grooves 154 are guide bars 155 having upwardly extending buttons 156 protruding through the slots 153 into the notched ends of the cranks 151. The guide bars 155 are also provided with depending shanks 157 extending into grooves 158 diagonally disposed in the upper ends of slide blocks 159 arranged in the housing 145. (See Fig. 9). The slide blocks 159 are on a rod 160 disposed longitudinally of the housing 145 and encircling said rod are coiled compression springs 161. Two of these springs are arranged between blocks 159 and transverse pins 162 carried by the rod 160. Another spring is arranged between an end wall of the housing 145 and another of the pins 162. Another spring is arranged between one of the blocks 159 and a head 163 on the end of the rod 160. This head has a depending pin 164 extending through a slot 165 provided therefor in the bottom of the housing 145. The lower end of the pin 164 has a revoluble wheel 166 between collars 167 of a sleeve 168 upon the rock shaft 123. Engaging the sleeve 168 is the upper forked or bifurcated end of a lever 169 fulcrumed upon a lateral extension 170 of the arm 127. The lower end of the fulcrum lever 169 extends in proximity to the large cam 126 and is provided with a roller 171. To actuate the fulcrumed lever 169 a cam trip member 172 is employed in connection with the lower enlarged end of the arm 127. The trip member 172 is pivotally mounted by a pin 173 in a slot 174 provided therefor in the wall 133 of the arm 127. The trip member 172 has a cam 175 to engage the roller 171 and short and long projections 176 and 177 respectively adapted to be successively engaged by the roller 128 of the large cam 126. When the roller 128 engages the projection 176 of the member 172, the cam 175 thereof is projected from the side of the arm 127 to impinge against the roller 171 and rock the lever 169 upon its fulcrum. When the lever 169 is rocked the sleeve 168 is shifted upon the rock shaft 123 and consequently the rod 160 within the housing 145 is shifted, thereby imparting movement to the blocks 159, slide bars 154, the buttons 156, and the cranks 151 of the gripping arms 147. The arms are closed, thereby allowing the transferring device to be tilted by the mechanism employed for that purpose. By reference to Fig. 10 of the drawings, it will be noted that the cam 175 remains in engagement with the roller 171 while the roller 128 of the large cam 126 travels to the upper end of the slot 132 and then downwardly along the wall 134 to impinge upon the projection 177. Such action on the part of the roller 128 is shown in Fig. 11 and the roller can ride into or between the projections 176 and 177 and engage the former. It is therefore apparent that there is a dwell for the closed gripping arms 147 corresponding to one fourth of a revolution of the shaft 98 and it is during this period that the transferring device is tilted and horizontally reciprocated, thus permitting of bottles being shifted and released by the arms 147.

*Conveyer*, (Figs. 16, 17, 18, 19 and 20.)—Secured to the side wall 9 of the machine housing, adjacent the top plate 11, by screw bolts 192 or other fastening means are the end flanges 193 of parallel conveyer walls 194. These walls have the upper edges thereof flared outwardly and the lower edges thereof bent inwardly whereby the walls will form an open trough conforming in cross section to the breast portion of a bottle. The walls 194, at the inner ends thereof, have offset portions 195 lined with pieces of rubber or other yieldable material 196. It is between these pieces of yieldable material that a bottle is deposited and the yieldable material eliminates breakage. The lining is flush with the inner sides of the walls 194, whereby a bottle delivered into the conveyer can be intermittently moved or pushed along the same, as will hereinafter appear.

As heretofore stated, the side walls 9 and 10 of the machine housing are cut away to provide clearance for certain operating mechanism and the wall 9, at one of the openings thereof and in proximity to the inner end of the conveyer, has a depending lug 197. Secured to this lug and extending outwardly from the machine beneath the conveyer is a guide rod 198 that is rectangular in cross section and employed for supporting a slide head 199. The slide head has a bottle shifting arm 200 that extends upwardly into the trough formed by the walls 194 of the conveyer. The arm 200 is curved to conform to the breast of a bottle and has a lining of rubber or other yieldable material 201. The rear side of the slide head 199 is provided with a projection 202 connected to a specially designed link of a sprocket chain 203, which is trained over sprocket wheels 204 and 205. The former is revolubly supported by a bracket 206 mounted upon the guide rod 198, and the latter is carried by the wall 10 of the machine housing. As shown in Fig. 16, the sprocket chain 203 extends transversely of the machine and a link 207 of said chain is connected to a depending extension 208 of the arm 127 (Figs. 16 and 20). It is therefore apparent that when the arm 127 is horizontally reciprocated a similar movement is imparted to the chain 203, consequently the bottle shifting arm 200 is moved back and forth to engage behind bottles and advance the same in the trough of the conveyer.

Bottles are delivered into the inner end of the conveyer by the bottle transferring device and are advanced from the inner end to the outer end by the bottle shifting arm 200 engaging the innermost bottle. Provision has been made for maintaining the bottles upright in the conveyer, especially to prevent a shifted bottle from falling into the inner end of the conveyer after the bottle shifting arm 200 recedes. This is accomplished by providing the upper and lower edges of the walls 194 with sets of detents 209 and 210, the detents 209 coöperating in bracing the large end of a bottle and the detents 210 the small or neck end of a bottle. The detents 209 are carried by the upper ends of rock shafts 211 journaled in vertically alining bearings 212 and 213, carried by the outer side of a wall 194. The rock shafts 211, intermediate the bearings 212 and 213 are provided with collar 214 and connected with said collar and the bearings 213 are the end convolutions of coiled springs 215 encircling the rock shaft. The bearings 212 are provided with stops 216 engaged by the inner ends of the detents 209, said stops retaining the detents 209 normally at right angles to the walls 194. The springs 215 allow the detents to yield in the direction of the outer end of the conveyer, said detents shifting when bottles are pushed in engagement therewith, but immediately assuming normal position whereby a bottle will be prevented from tilting when between the detents. The detents 210 are constructed and arranged along the lines of the detents 209, with the exception that they are more closely assembled, thus permitting of the small or neck end of a bottle being properly held. Coöperating with the sets of detents 209 and 210 are clamping bars 217 yieldably supported at the upper edges of the walls 194. The clamping bars 217 are provided with outwardly extending apertured lugs 218 pivotally connected to cranks 219 of rock shafts 220. These shafts are journaled in bearings 221 carried by the outer sides of the walls 194. The shafts 220 extend below the bearings 221 and are provided with heads 222. Connected to the heads 222 and the bearings 221 are the end convolutions of coiled springs 223 encircling the rock shafts 220, said springs holding the clamping bars 217 normally extended over the upper edges of the walls 194. The confronting sides of the clamping bars 217 are provided with bottle engaging strips 224, and with bottles contacting between the strips it is possible to push the bottles along the conveyer and maintain the same in a vertical inverted position.

*General operation.*—In order that the function of various cams, levers and associated instrumentalities can be readily understood in timed relation and sequence of operation, reference will be had to Figs. 21 and 22. It is thought best to consider the entire machine as though operating and start with the placing of an inverted bottle in the machine. As there is a period of time in which four bottles are in the machine, representing four positions, it will be possible to follow a bottle from one position to another and for this reason such positions or stations have been generally designated A, B, C, and D in conjunction with Figs. 21 and 22 of the drawings. During the operation of the reciprocable and tiltable transferring device and the delivery of a bottle, the crank 47 of the shaft 45 is causing the cam 50 to assume its lowermost position. This cam, through the medium of the presser head 55, arms 56 and 57, lowers the center and end telescopic yieldable bottle supports. With these supports lowered, bottles in the machine are transferred from one position to another leaving the position or station A vacant. The attendant of the machine can therefore place an inverted bottle in the retaining member 20 and a further movement of the cam 50 gradually releases the center and end bottle supports allowing the tension of the springs 31 and 88 to elevate the supports, thereby placing the open ends of the bottles in positions A, B, and C in the mouth pieces of said supports. During the depressed position of the bottle supports, the valves 85 of the end supports prevent the discharge of water therefrom and the interior cleaning brush 60 being housed within the center bottle support 34 retards an excessive discharge of water from said support, but immediately upon the cross heads 84 impinging upon the open ends of the bottles, the valves 85 are open and water under pressure from the reservoir 24 is discharged into the bottles held by the end supports. The cam 50 now starts to ascend and the bottles are held in the positions A, B, and C; the bottle having been delivered from the position D to the bottle conveyer. Water is injected into the bottles held in the positions A and C upon the end bottle supports and simultaneously with this injection the center telescopic yieldable bottle support is revolved in one direction and the interior cleaning brush 60 in the opposite direction. As the cam 50 ascends the reciprocable and tiltable transferring device remains at rest, and the housing 183 and its appurtenant parts are raised upon the tubular brush rod 59, thereby projecting the brush 60 into the bottle of the central bottle support, causing the bristles thereof to engage the inner walls of the bottle. During this operation the housing 183 revolves in the trunnioned collar 61; motion being imparted to the housing through the medium of the worm 63, worm 67 and power shaft 68. The brush 60 is therefore revolved in the bottle of the center bottle support and said bottle support and the bottle thereon are revolved in an opposite direction through the medium of the friction drive shown in Fig. 4. The friction drive is associated with the exterior cleaning brush. This brush is driven in a direction similar to the interior cleaning brush. The exterior cleaning brush is operated through the medium of a worm 96, gear wheel 97, shaft 98, sprocket wheels 99 and 101, sprocket chain 100, stud shaft 45, sprocket wheels 42 and 44, sprocket chain 43, shaft 41, gear wheels 71, worm 70 and power shaft 68. When the central bottle support 34 is elevated to engage a bottle placed in position, the central spindle 19 places the disk 109 in contact with the disk 106 bearing against the disk 110, and as the disk 106 is driven through the medium of the gear wheels 102 and 103 from the exterior cleaning brush, the central bottle support 34 is revolved. It is therefore apparent that the interior and exterior cleaning brushes continuously revolve and the central bottle support 34 has been arranged upon the anti-friction bearing 35 whereby it can freely revolve should the revolving interior brush 60 have a tendency to rotate the support. It will be noted however that when a bottle is removed from the central support 34 that the connection between said support and the spindle 19 is broken, allowing the spindle 19 to descend by gravity and thereby move the disk 109 out of contact with the driven disk 106.

During the exterior and interior cleansing operation, by brushes and water, the cam 50 has reached its ascendency and is on the descent, the presser head 55 moving toward the collars 58 and 89 of the uprights 28 and 74. Moving in synchronism with the cam 50 is the trunnion collar 61, consequently the brush 60 is gradually being withdrawn from the bottle of the center support 34. By the time the presser head 55 impinges against the collars 58 and 89 the brush 60 is housed within the support 34 and as the uprights 28 and 74 are lowered by the presser head 55, the bottles in positions A, B and C are released as far as the center and end supports are concerned.

During the above operations certain operations have been taking place in connection with the reciprocable and tiltable transferring device, and in order to understand these operations it is necessary to go back to the bottle placed in position A and consider the withdrawal of the brush 30 from the bottle in position B. Simultaneous with the withdrawal of the brush 60 from the bottle in position B, the clamping arms 147 grip the three bottles in the machine this being accomplished through the medium of the trip member 172, roller 171, fulcrumed lever 169, sleeve 168, pin 164, rod 160, blocks 159, and buttons 156 engaging the cranks 151 of the clamping arms. The shaft 98 is driven in synchronism with the shaft 45 and it is by virtue of the roller 128 engaging the short projection 176 of the trip member 172 that said trip member is shifted to engage the roller 171, as best shown in Fig. 10. The trip member 172 is placed squarely between its pivot pin 173 and the roller 171, and as the fulcrumed lever 169 is carried by the arm 127, the trip member 172 will not become accidentally displaced and will therefore retain the gripping arms 147 in engagement with the bottles.

The various operations in connection with the reciprocable and tiltable transferring device can be readily followed out in connection with Fig. 21, where it will be observed that after the bottles are gripped there is a period of rest until the interior cleaning brush 60 has been completely withdrawn from the bottle in the position B. Then the entire transferring device is lowered to remove the closed ends or bottoms of the bottles from the retaining members 20. This is accomplished by the small cam 125 engaging the roller 118 of the transverse frame 113. As this frame supports the rock shaft 123 and its appurtenant parts, the bottles held by the gripping arms 147 are lowered and retained in such position until the housing 145 is shifted longitudinally of the rock shaft 123. During the lowering of the transferring device, the roller 128 of the large cam 126 enters the upper end of the slot 132 of the arm 127 and as the large cam 126 continues to revolve, the roller 128 is carried into engagement with the concave wall 134 of said slot, consequently the arm 127 is shifted upon the transverse bar 131 and by reason of the forked end of the arm extending between the lugs 124, the housing 145 is shifted toward the delivery side of the machine. The exact distance traversed by the transferring device is the distance between bottle support centers, consequently the bottles held by the gripping arms 147 are correctly positioned over the supports, and the bottle originally placed in position A is transferred to position B or the central bottle support 34, and the bottle originally in position C is shifted out of the machine ready to be delivered into the bottle conveyer. There is now a period of rest and it is during such dwell that a bottle can be placed in position A. Before the gripping arms 147 release the bottles, there is a slight elevation of the bottles caused by the auxiliary cam surface 227 of the small cam 125, said auxiliary cam surface allowing the bottles in positions B and C to partially enter the retaining members 20. This is essential in order to prevent the bottles from tilting or revolving while being held or released by the gripping arms 147. This dwell is momentary in order that the clamping arms can completely release the bottle and permit of said bottle being held by the center and end supports in conjunction with the retaining members 20.

As the gripping arms release the bottles, the large cam 126 impinges against the roller of the bell crank 139 and it is through the medium of this bell crank that the shaft 123 is rocked to tilt the housing 145, as best shown in Fig. 12. The clamping arms 147 are therefore carried rearwardly clear of the bottles, and it is now possible to restore the transferring device to its normal position. Just prior to the large cam 126 engaging the roller 144 of the bell crank 139, the roller 128 of the large cam enters the lower end of the slot 132 of the arm 127 and immediately upon said roller having shifted the arm 127 to the delivery side of the machine, said roller in entering the lower end of the slot 132 impinges upon the long projection 177 of the trip member 172. By lowering this long projection the trip member releases the fulcrum lever 169 and it is through the medium of the springs 161 within the housing 145 that the clamping arms 147 release the bottles. As the large cam 126 continues to revolve, the arm 127 is shifted to its normal position, the roller 128 of said cam engaging the concave wall 133 of the slot 132. As the transferring device starts to move to its normal position, the roller 128 impinges upon the short projection 176 of the trip member 172 and by the time the transferring device is at its normal position, the trip member 172 is gradually shifted to again actuate the fulcrum lever 169 and thereby clamp the arms 147 upon bottles in the positions A, B and C.

To recapitulate, the bottle placed in position A receives an initial rinsing and then is transferred to position B where it receives exterior and interior cleaning by the action of the brushes and water and then transferred to position C for a final interior rinsing. From this position it is shifted to position D and deposited in the bottle conveyer. The bottles in this conveyer are intermittently moved away from the machine, and the construction and arrangement of parts are such that the bottle can be safely handled. The bottle conveyer is operated in synchronism with the reciprocable transferring device and in such timed relation as to preclude any possibility of the machine being choked.

In following out the various operations in connection with Figs. 21 and 22 it is only necessary to bear in mind that the radial lines of these figures and their designation simply indicate what is taking place at the various positions of the cam roller 128 and the crank roller 48.

What I claim is:—

1. In a bottle washing machine, a bottle support adapted to hold an inverted bottle, a brush, a rod supporting said brush, means sleeved on said rod adapted for raising and lowering said rod, and means within said rod moving means adapted to release said rod by sliding thereon when the brush of said rod encounters an obstacle in a bottle.

2. In a bottle washing machine, a yieldable bottle support adapted to hold an inverted bottle, means for revolving the bottle, a brush rod, means for projecting said brush rod into the bottle and revolving said brush rod in an opposite direction to that of said bottle support, and means for exerting a lateral pressure on said brush rod and independent of said brush rod revolving means adapted to release said brush rod when the brush of said rod encounters an obstacle in a bottle.

3. Bottle washing means comprising a brush rod adapted to enter a bottle, means adapted for revolving said brush rod, means slidable on said brush rod independent of the brush rod, revolving means adapted for reciprocating said brush rod, and means within said slidable means exerting a lateral pressure on said brush rod adapted to hold said slidable means normally fixed relative to said brush rod.

4. In a bottle washing machine, a reservoir, a tubular bottle support above said reservoir adapted to support a bottle, a tube in communication with said reservoir, a rod reciprocable on said tube and communicating with the upper end of said tube to receive water therefrom, and means for reciprocating said rod.

5. In a bottle washing machine, a reservoir, a tubular bottle support above said reservoir, adapted to support a bottle, a tube in communication with said reservoir and normally extending into said bottle support, a rod reciprocable on said tube and communicating with the upper end of said tube to receive water therefrom and adapted to be projected into a bottle, means for reciprocating said rod, and means forming part of said rod reciprocating means adapted to release said reciprocating means relative to said rod should said rod encounter an obstacle at any moment during the movement of said rod into the bottle.

6. Bottle washing means, comprising a reservoir, a tube in communication with said reservoir, a rod reciprocable on said tube, a brush on the outer end of said rod and adapted for entering a bottle, means for reciprocating said rod, and a slip member between said rod and said reciprocating means adapted to release said reciprocable means relative to said rod at any moment said brush encounters an obstacle when entering the bottle.

7. In a bottle washing machine, the combination with a revoluble bottle support, of a reciprocable and tiltable bottle transferring device adapted to place a bottle on said support and remove the same, said device comprising a horizontal reciprocable housing, means on said housing adapted to automatically grip a bottle, intermittently actuated means for reciprocating the housing and intermittently actuated means for tilting the housing.

8. In a bottle washing machine, the combination with a revoluble bottle support, of a reciprocable and tiltable bottle transferring device adapted to place a bottle on said support and remove the same, said device comprising a horizontal reciprocable housing, means on said housing adapted to automatically grip a bottle, intermittently actuated means for reciprocating the housing, intermittently actuated means for tilting the housing, and intermittently actuating means for lowering said housing when a bottle is held by said arms.

9. In a bottle washing machine, the combination with a revoluble bottle support, of a reciprocable and tiltable bottle tranferring device adapted to place a bottle on said support and remove the same, said device comprising a rock shaft, a horizontal reciprocable housing thereon, sets of bottle gripping arms on said housing, and means in said housing for moving said arms.

10. In a bottle washing machine, the combination with a revoluble bottle support, of a reciprocable and tiltable bottle transferring device adapted to place the bottle on said support and remove the same, said device comprising a horizontal reciprocable housing, bottle gripping arms on said housing, intermittently actuated means for reciprocating said housing, intermittently actuated means for tilting said housing, and intermittently actuated means for lowering said housing when a bottle is held by said arms.

11. In a bottle washing machine, the combination with a revoluble bottle support, of a reciprocable and tiltable bottle transferring device adapted to place a bottle on said support and remove the same, said device comprising a rock shaft, a horizontal reciprocable housing thereon, sets of bottle gripping arms on said housing, means for reciprocating said housing on said shaft, and means for rocking said shaft to tilt said housing at the end of each horizontal reciprocation of said housing.

12. In a bottle washing machine, the combination with a revoluble bottle support, of a reciprocable and tiltable bottle transferring device adapted to place a bottle on said support and remove the same, said device comprising a rock shaft, a horizontal reciprocable housing thereon, sets of bottle gripping arms on said housing, means for reciprocating said housing on said shaft, means for rocking said shaft to tilt said housing at the end of each horizontal reciprocation of said housing, and intermittently actuated means adapted to lower said shaft and said housing when a bottle is held by said arms.

13. In a bottle washing machine, the combination with a revoluble bottle support, of a reciprocable and tiltable bottle transferring device adapted to place a bottle on said support and remove the same, said device comprising a rock shaft, a horizontal reciprocable housing thereon, a rod reciprocable in said housing, gripping arms on said housing, means actuated by said rod to move said arms, cam actuated means for moving said rod, means for reciprocating said housing on said shaft during the gripping action of said arms, and means for rocking said shaft to tilt said housing at the end of each horizontal reciprocation of said housing.

14. In a bottle washing machine, the combination with a revoluble bottle support, of a reciprocable and tiltable bottle transferring device adapted to place a bottle on said support and remove the same, said device comprising a rock shaft, a horizontal reciprocable housing thereon, a rod reciprocable in said housing independent thereof, sets of bottle gripping arms on said housing, means actuated by said rod to move said arms, means for moving said rod, means for reciprocating said housing on said shaft, means for rocking said shaft to tilt said housing at the end of each horizontal reciprocation of said housing, and intermittently actuated means adapted to lower said shaft and said housing when a bottle is held by said arms.

15. In a bottle washing machine, an interior cleaning brush and operating mechanism therefor, comprising a revoluble water supply tube, a reciprocable brush carrying rod on said tube and adapted for rotation therewith, means for revolving said tube, means for reciprocating said rod, and means adapted to release said rod relative to the reciprocating means during any moment of movement in one direction thereof.

16. In a bottle washing machine, a reservoir, a tubular rotatable bottle support above said reservoir and adapted to be manually depressed to receive an inverted bottle, means operable above said support to rotate said support in one direction, a revoluble tube in communication with said reservoir and extending into said bottle support, a brush normally in said bottle support, means on said tube to move said brush into and out of a bottle on said support, and means to revolve said tube in a direction opposite to said supports.

17. In a bottle washing machine, a reservoir, a tubular rotatable bottle support above said reservoir and adapted to support an inverted bottle and have movement imparted thereto through the medium of said bottle, a revoluble tube in communication with said reservoir and normally extending into said bottle support, a brush normally in said bottle support, means on said tube to move said brush in and out of a bottle on said support, and means for actuating said brush moving means.

18. In a bottle washing machine, a reservoir, a tubular bottle support above said reservoir and adapted to support an inverted bottle, a revoluble tube in communication with said reservoir and extending into said bottle support, a brush normally in said bottle support, means on said tube to move said brush into and out of a bottle on said support, means for actuating said brush moving means, and means adapted to automatically release said actuating means relative to said brush moving means at any moment during the entrance of said brush into a bottle.

19. In a bottle washing machine, a reservoir, a tubular bottle support above said reservoir and adapted to support an inverted bottle, a revoluble tube in communication with said reservoir and normally extending into said bottle support, a rod reciprocable on said tube adapted to rotate therewith and communicating with the upper end of said tube to receive water therefrom, a brush on the upper end of said rod, and means for reciprocating said rod.

20. In a bottle washing machine, a reservoir, a tubular bottle support above said reservoir and adapted to support an inverted bottle, a revoluble and otherwise stationary tube in communication with said reservoir and extending into said bottle support, a rod reciprocable on said tube and adapted to rotate therewith, a brush on the upper end of said rod, means for reciprocating said rod, and a slip joint between said means and said rod adapted to release said rod at any moment during an upward movement of said rod.

21. In a bottle washing machine, the combination with a reservoir containing water under pressure, of telescopic yieldable uprights, a tubular support thereon and adapted to support an inverted bottle, a revoluble tube in communication with said reservoir and extending through said tubular bottle support, a rod reciprocable on said tube and adapted to rotate therewith and extend above said bottle support, a brush carried by said rod, a housing at the lower end of said rod, a slip member in said housing normally holding said housing at the end of said rod, and a collar movably supporting said housing.

22. In a bottle washing machine, the combination with a reservoir containing water under pressure, of a tubular bottle support thereon and adapted to support an inverted bottle, a revoluble tube in communication with said reservoir and extending through said tubular bottle support, means for revolving said tube, a rod reciprocable on said tube and adapted to rotate therewith and extend above said bottle support, a brush carried by said rod, a housing at the lower end of said rod, a slip member in said housing normally holding said housing at the lower end of said rod, and a collar movably supporting said housing.

23. In a bottle washing machine, the combination with a reservoir containing water under pressure, of a tubular bottle support thereon and adapted to support an inverted bottle, a revoluble tube in communication with said reservoir and extending through said tubular bottle support, means for revolving said tube, a rod reciprocable on said tube and adapted to rotate therewith and extend above the said bottle support, a brush carried by said rod, a housing at the lower end of said rod, a slip member in said housing normally holding said housing at the lower end of said rod, a collar movably supporting said housing, and means for raising said housing and said rod relative to said tube.

24. In a bottle washing machine, the combination with a reservoir containing water under pressure, of a tubular bottle support thereon and adapted to hold an inverted bottle, a revoluble tube in communication with said reservoir and extending through said tubular bottle support, a rod reciprocable on said tube and adapted to rotate therewith and extend above said bottle support, a nozzle carried by said rod, a brush carried by said nozzle, a housing at the lower end of said rod, a slip member in said housing normally holding the same at the end of said rod, and a collar movably supporting said housing.

25. In a bottle washing machine, the combination with a reservoir containing water under pressure, of a tubular bottle support thereon and adapted to hold an inverted bottle, a revoluble tube in communication with said reservoir and exending through said tubular bottle support, a rod reciprocable on said tube and adapted to rotate therewith and extend above said bottle support, a nozzle carried by said rod, a brush carried by said nozzle, a housing at the lower end of said rod, a slip member in said housing normally holding the same at the end of said rod, a collar movably supporting said housing, and means for raising said housing and said rod relative to said tube.

26. In a bottle washing machine, the combination with a reservoir containing water under pressure, of telescopic yieldable uprights, a tubular bottle support thereon and adapted to support an inverted bottle, a revoluble tube in communication with said reservoir and extending through said tubular bottle support, means for revolving said tube, a rod reciprocable upon said tube and adapted to rotate therewith and extend above said bottle support, a nozzle carried by said rod, a brush carried by said nozzle, a housing at the lower end of said rod, a slip member in said housing normally holding the housing at the end of said rod, and a collar movably supporting said housing.

27. In a bottle washing machine, the combination with a reservoir containing water under pressure, of telescopic yieldable uprights, a tubular bottle support thereon and adapted to support an inverted bottle, a revoluble tube in communication with said reservoir and extending through said tubular bottle support, means for revolving said tube, a rod reciprocable on said tube and adapted to rotate therewith and extend above said bottle support, a nozzle carried by said rod, a brush carried by said nozzle, a housing at the lower end of said rod, a slip member in said housing normally holding the housing at the end of said rod, a collar movably supporting said housing, and means for raising said housing and said rod relative to said tube.

28. A bottle washing machine comprising a revoluble bottle support, a reciprocable and tiltable bottle transferring device adapted to place a bottle on said support and remove the same to the delivery side of said machine, said device comprising a horizontal reciprocable housing, means on said housing adapted to automatically grip a bottle, intermittently actuated means for reciprocating the housing, a bottle conveyer at the delivery side of said machine adapted to receive bottles from said transferring device, and means alternately actuated relative to said transferring device for moving bottles in said conveyer.

In testimony whereof I affix my signature in presence of two witnesses.

THEODORE G. LINDERME.

Witnesses:
ANNA M. DORR,
KARL H. BUTLER.

Copies of this patent may be obtained for five cents each, by addressing the "Commissioner of Patents, Washington, D. C."